United States Patent
Ebisawa

(12) 
(10) Patent No.: US 6,263,504 B1
(45) Date of Patent: Jul. 17, 2001

(54) DATA DELIVERY SYSTEM, DATA RECEIVING APPARATUS, AND STORAGE MEDIUM FOR VIDEO PROGRAMS

(75) Inventor: Kan Ebisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/677,994

(22) Filed: Oct. 3, 2000

Related U.S. Application Data

(63) Continuation of application No. 08/754,268, filed on Nov. 20, 1996, now Pat. No. 6,144,400.

(30) Foreign Application Priority Data

Nov. 27, 1995 (JP) .................................................. 7-307989

(51) Int. Cl.⁷ .................................................. H04N 7/173
(52) U.S. Cl. .......................... 725/101; 386/125; 725/91; 725/100
(58) Field of Search ........................... 725/91, 100, 101; 386/111, 125; 348/432.1; 455/4.2, 5.1; H04N 7/173

(56) References Cited

U.S. PATENT DOCUMENTS

| | | | |
|---|---|---|---|
| 5,414,455 | 5/1995 | Hooper et al. | 725/88 |
| 5,442,390 | 8/1995 | Hooper et al. | 725/100 |
| 5,477,263 | 12/1995 | O'Callaghan et al. | 725/102 |
| 5,761,417 | 6/1998 | Henley et al. | 709/231 |
| 5,808,607 | 9/1998 | Brady et al. | 725/114 |
| 5,884,141 | 3/1999 | Inoue et al. | 725/101 |
| 5,899,582 | 5/1999 | Dulac | 386/125 |
| 6,144,400 | * 11/2000 | Ebisawa | 725/101 |

* cited by examiner

*Primary Examiner*—Howard Britton
(74) *Attorney, Agent, or Firm*—Frommer Lawrence & Haug, LLP.; William S. Frommer

(57) ABSTRACT

In an NVOD system, a data storage unit is provided in a receiving apparatus, whereby a video program can be provided with an instantaneous response equivalent to the VOD system. Namely, the data of the first part of the video data is stored in the data storage unit in advance. When there is a request for reproduction, that stored data is immediately reproduced. The data after the first data is sent from a transmitting apparatus in the same way as an NVOD system heretofore. Buffering is performed in the receiving apparatus, and the resultant data is reproduced continuous with the data of the first part.

3 Claims, 7 Drawing Sheets

DATA DELIVERY SYSTEM, DATA RECEIVING APPARATUS, AND STORAGE MEDIUM FOR VIDEO PROGRAMS

This application is a continuation of U.S. application Ser. No. 08/754,268, filed Nov. 20, 1996, U.S. Pat. No. 6,144,400.

BACKGROUND OF THE INVENTION

1. Field of the Invention

The present invention relates to a data delivery system, a data receiving apparatus, and a storage medium suitable for use in a video on demand system which can deliver video data in accordance with for example a request generated at any time.

2. Description of the Related Art

There has long been a demand for realization of a practical video on demand (VOD) system which can instantaneously provide a video program in accordance with the request of a receiver. A VOD system able to individually respond to requests generated at any time, however, would require an extremely large sized data transmitting apparatus performing complex processing.

Therefore, a near video on demand (NVOD) system which enables the configuration of the data transmitting apparatus to be simplified while realizing a similar function to that of a VOD system has been proposed. The NVOD system which has been proposed heretofore is a system that transmits a certain program to a plurality of channels at predetermined time intervals, selects a channel at which that program is started from the start from the next time zone in response to a request generated in a certain time zone, and provides that program.

Such an NVOD system, however, due to its basic setup, of courses results in a certain waiting time before the receiver can starts to view the desired program. This waiting time is tedious for the receiver. Therefore, instantaneous response equivalent to that of a true VOD system is now desired for NVOD systems as well.

SUMMARY OF THE INVENTION

An object of the present invention is to provide a data delivery system suitable for use for a VOD system which can instantaneously provide video data in response to a request with a configuration of hardware equivalent to that of an NVOD system.

Another object of the present Invention is to provide a data receiving apparatus which can instantaneously provide video data in response to a request even though receiving transmission of video data similar to that of an NVOD system.

Still another object of the present invention is to provide a storage medium suitable for use for a receiving apparatus of a data delivery system featuring an instantaneous response equivalent to that of a VOD system by a configuration of hardware equivalent to that of an NVOD system.

In order to achieve the above objects, the present invention provides an NVOD system in which a storage device is provided at the user terminal side so as to enable the same service as that by a VOD system to be provided. Namely, the data of the first part of the video data is stored in the receiving apparatus in advance. When there is a request for reproduction, the stored data is immediately reproduced. The data after the first data is delivered in the same way as the NVOD system heretofore and buffered within the receiving apparatus. This data is reproduced to continue after the data of the first part.

According to a first aspect of the present invention, there is provided a data delivery system which has a transmitting apparatus and a receiving apparatus and sends data forming a video program from the transmitting apparatus to the receiving apparatus, the data delivery system comprising: a first data outputting means provided in the transmitting apparatus for outputting data subsequent to a predetermined time's worth of data at the start of a video program to a plurality of channels staggered by a time zones each comprised of the predetermined time at the longest; a first storage means provided in the receiving apparatus for storing in advance the predetermined time's worth of data of the start of the video program to be delivered; a channel selecting means for selecting the channel at which the data subsequent to the predetermined time's worth of data of the start of the video program will be output earliest from among the plurality of channels in accordance with a request for reception of the video program generated from the receiving apparatus in a certain time zone among the time zones; a second storage means for sequentially storing the data of the selected channel and, at the same time, sequentially reproducing the stored data; and a data reproducing means provided in the receiving means for reproducing the data stored in the first storage means in accordance with the request for reception, sequentially reproducing the data sequentially stored in the second storage means following the reproduction of this data, and thereby restoring the video program.

According to a second aspect of the invention, there is provided a data receiving apparatus which receives data forming a predetermined video program and subsequent to a predetermined time's worth of data of the start of the video program to be delivered is distributed to a plurality of channels staggered by time zones each comprised by the predetermined time at the longest and reproduces the same on a monitor, the data receiving apparatus comprising: a first storage means for storing the predetermined time's worth of data of the start of the video program; a second storage means for sequentially storing data subsequent to the predetermined time's worth of data at the start of the video program selected In accordance with a request for reception of data forming the video program generated in a certain time zone among the time zones and, at the same time, sequentially reproducing the same; and a data reproducing means for reproducing the data stored in the first storage means in accordance with the request for reception and sequentially reproducing the data sequentially stored in the second storage means following the reproduction of this data so as to restore the video program.

According to a third aspect of the present invention, there is provided a recording medium used in a receiving apparatus for reproducing a video program in a data delivery system which distributes data subsequent to a predetermined time's worth of data of the start of a video program to be delivered among a plurality of video programs to a plurality of channels staggered by time zones comprised of the predetermined time at the longest, delivers this distributed data from a transmitting apparatus to the receiving apparatus, and plays back the delivered video program at the receiving apparatus, the recording medium having a means attachable and detachable to and from a recording and/or reproducing means provided in the receiving apparatus and a storage region for storing a predetermined time's worth of data of the start of each of the plurality of video programs being defined.

BRIEF DESCRIPTION OF THE DRAWINGS

These and other objects and features of the present invention will become more apparent from the following description of the preferred embodiments given with reference to the attached drawings, wherein.

DESCRIPTION OF THE PREFERRED EMBODIMENTS

A preferred embodiment of the present invention will be explained next by referring to FIG. 1 to FIG. 5.

Note that, in the explanation, the processing of the audio data corresponding to the video data was omitted.

Figure 1:
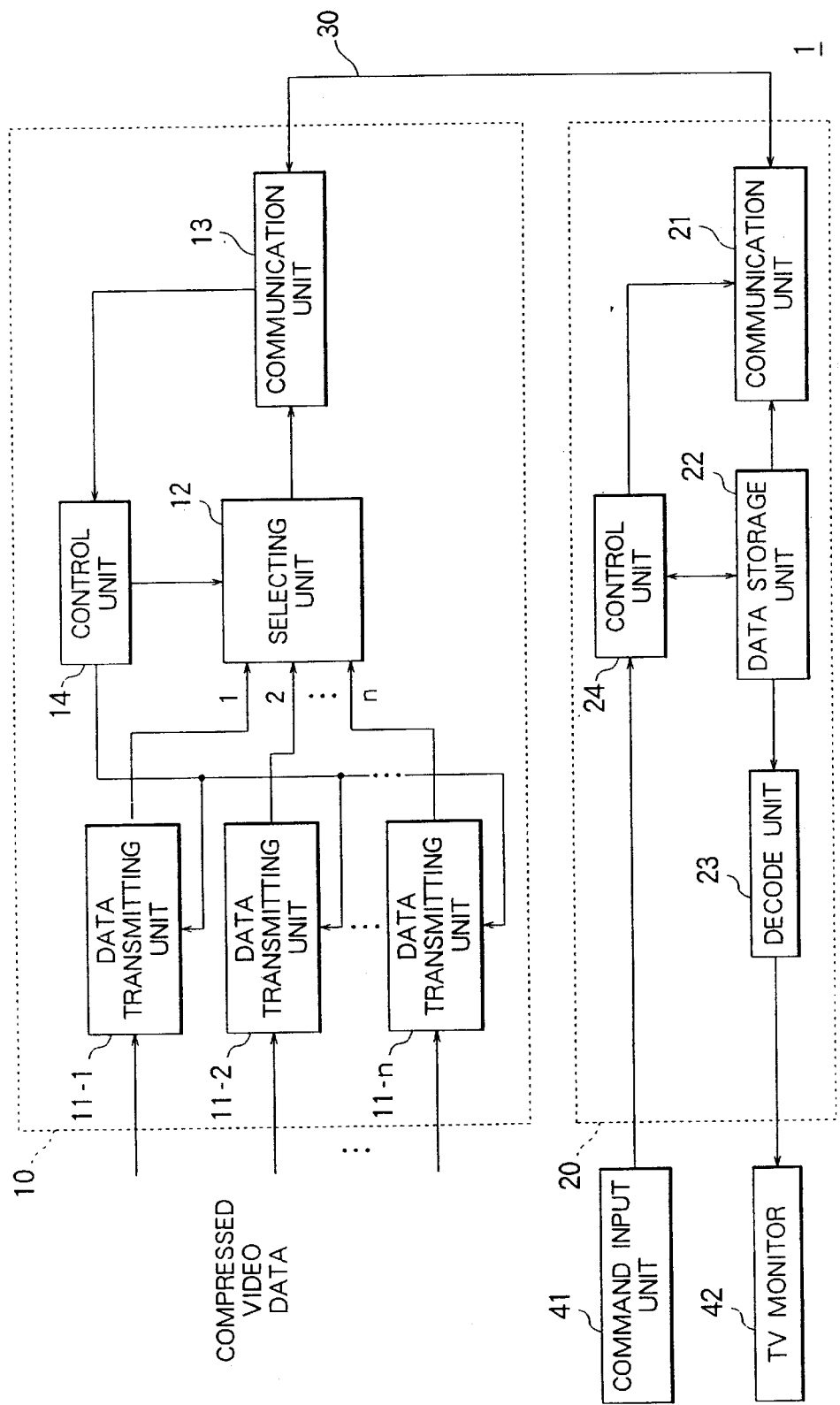
FIG. 1 is a view of the configuration of a data delivery system according to an embodiment of the present invention.

FIG. 1 is a block diagram of the configuration of a data delivery system 1 of a video program according to the present embodiment.

The data delivery system 1 is constituted by a transmitting apparatus 10 serving as a host apparatus, a receiving apparatus 20 serving as a user terminal, and a communication path 30 connecting them. To the receiving apparatus 20 is connected a command input unit 41 such as a remote control unit and a TV monitor 42. The viewer carries out an operation such as selection of the program he or she desires to view via the command input unit 41 and views the video data output to the TV monitor 42.

Figure 2:
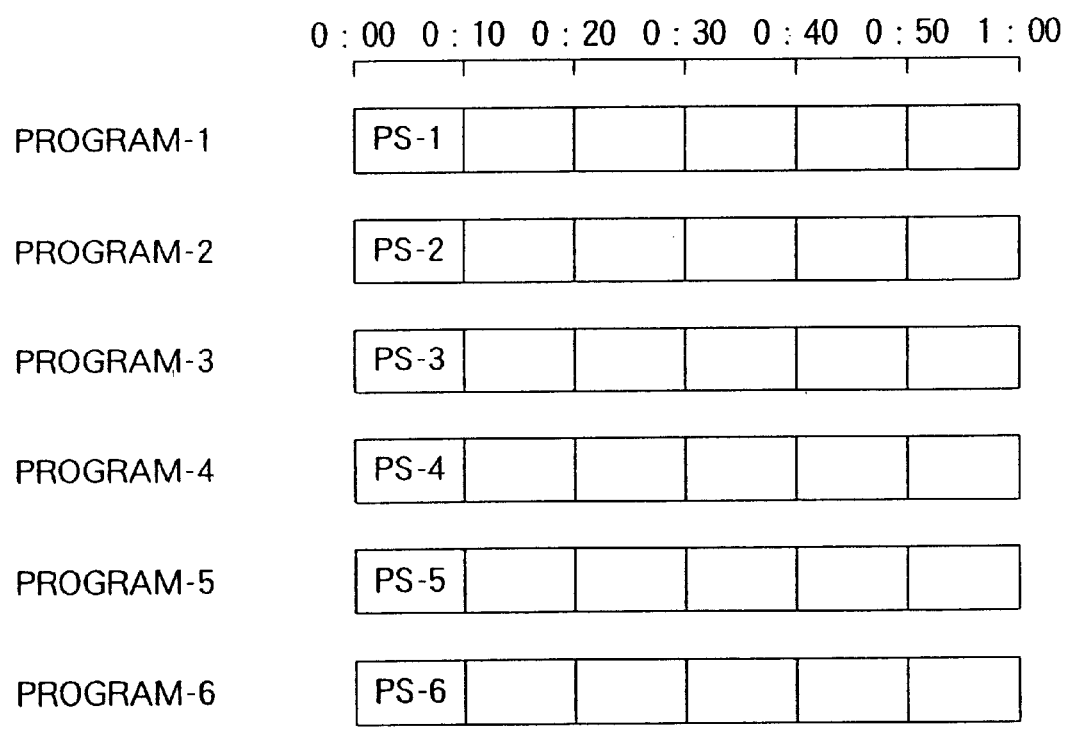
FIG. 2 is a view of program data provided by a data delivery system shown in FIG. 1.

Note that, in the present embodiment, an explanation will be made of the present invention taking as a concrete example a case where six one-hour programs PROGRAM-1 to PROGRAM-6 as shown in FIG. 2 are delivered by this data delivery system 1 so that the reproduction can be carried out from any time.

First, an explanation will be made of the configuration of the data delivery system 1.

The transmitting apparatus 10 comprises n number of data transmitting units $11_{-1}$ to $11_{-n}$, a selecting unit 12, a communication unit 13, and a control unit 14.

The data transmitting units $11_{-1}$ to $11_{-n}$, are provided corresponding to the channels 1 to n which can be selected by the viewer and output the video data to the corresponding channels. To the data transmitting units $11_{-1}$ to $11_{-n}$, compressed digital video data to be delivered is input from a not illustrated video data storage device for storage. At this time, assuming that the video data of a program is divided into m number of blocks of data for each time t, the second to m-th blocks of data are respectively stored in the m-1 number of data transmitting units 11i to $11_{-1}$ to $11_{-(i+n-2)}$. Namely, the video data except the block of data of the amount of the first time t of the data of that program is stored in the data transmitting units $11_{-1}$ to $11_{-n}$.

Then, based on a control signal input from the control unit 14, video data staggered by the time t is reproduced in the m-1 number of data transmitting units $11_{-n}$ to $11_{-(i+m-2)}$. The video data after the time t is sequentially output to the m-1 number of channels staggered by the time t.

Note that, the time t and the number m divided by are set to adequate values according to the number of the usable channels, the number of the programs to be provided, the storage capacity of the data storage unit 22 of the receiving apparatus 20 mentioned later, etc.

In the present embodiment, the data delivery system 1 sends six one-hour programs PROGRAM-1 to PROGRAM-6 as shown in FIG. 2. For this purpose, first, the 50 minutes of video data from the 10th minute to 60th minutes of each program is input to five data transmitting units $11_{-1}$ to $11_{-(i+4)}$ from the video data storage device. Namely, the 50 minutes of video data of the program PROGRAM-1 is input to the first to fifth data transmitting units $11_{-1}$ to $11_{-n}$; the 50 minutes of video data of the program PROGRAM-2 is input to the sixth to 10th data transmitting units $11_{-6}$ to $11_{-10}$; the 50 minutes of video data of the program PROGRAM-3 is input to the 11th to 15th data transmitting units $11_{-11}$ to $11_{-15}$; the 50 minutes of video data of the program PROGRAM-4 is input to the 16th to 20th data transmitting units $11_{-16}$ to $11_{-20}$; the 50 minutes of video data of the program PROGRAM-5 is input to the 21st to 25th data transmitting units $11_{-21}$ to $11_{-25}$; and then the 50 minutes of video data of the program PROGRAM-6 is input to the 26th to 30th data transmitting units $11_{-26}$ to $11_{-30}$.

Figure 3:
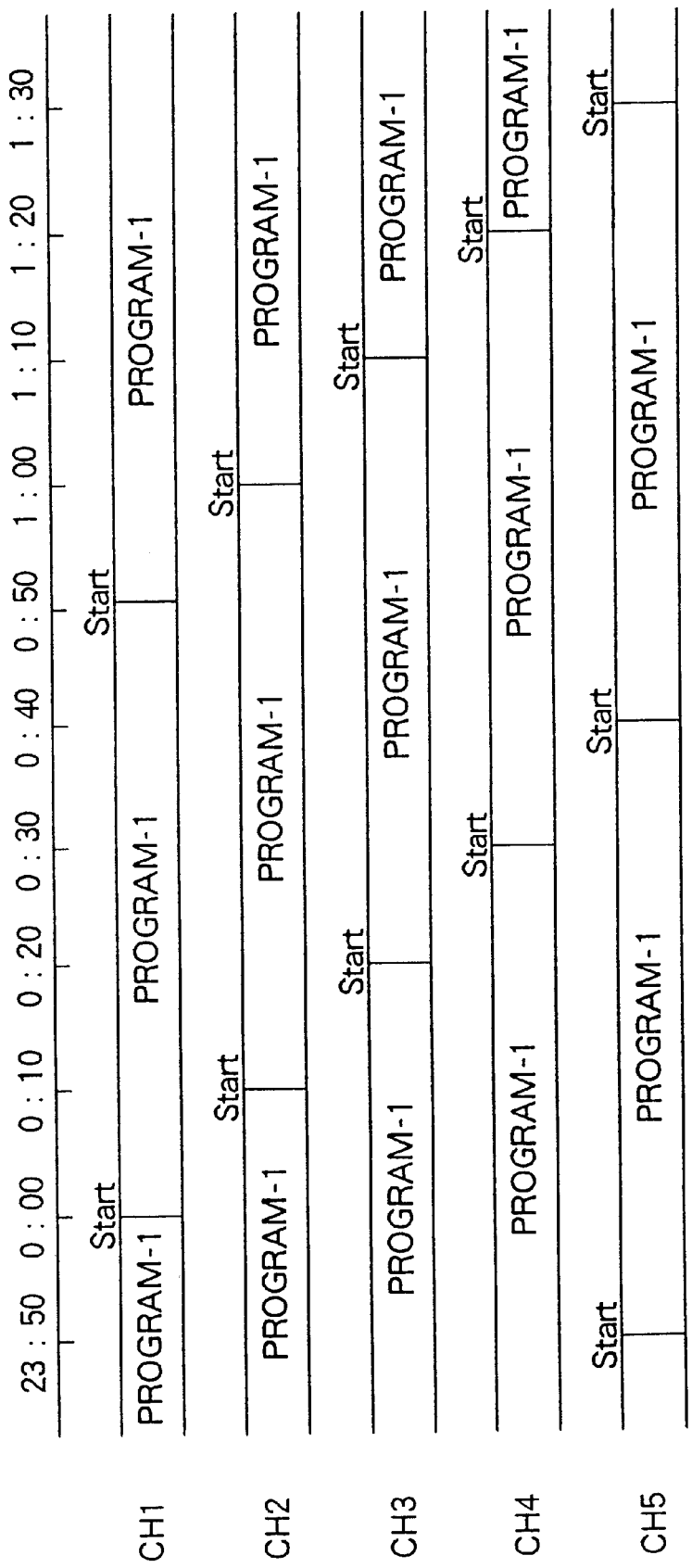
FIG. 3 is a view of video data output to channels for providing program data shown in FIG. 2 in the data delivery system shown in FIG. 1.

Then, for each program, video data staggered by 10 minutes each is reproduced at the data transmitting units $11_{-i}$ to $11_{-(i+4)}$ (i=1, 6, 11, 16, 21, 26). For example, for the program PROGRAM-1, five data streams each staggered by 10 minutes as shown in FIG. 3 are generated and output to the channels.

Note that, in the present embodiment, the video data to be input to the data transmitting units $11_{-1}$ to $11_{-n}$ is made data compressed by the MPEG2 system (system of coding moving pictures of the Moving Picture Experts Group).

Further, the data transmitting units $11_{-1}$ to $11_{-n}$ are constituted by high speed accessible hard magnetic disc devices.

The selecting unit 12 selects one stream of video data from among the streams of video data output to the n number of channels from the n number of data transmitting units $11_{-1}$ to $11_{-n}$ and outputs the same to the communication unit 13.

The communication unit 13 carries out the communication of the data and the control signal with the receiving apparatus 20. Concretely, it encodes the data and control signal to be transmitted to the receiving apparatus 20 to coded data for communication, transforms the same to the data format according to the predetermined communication protocol, and transmits this to the communication path 30. Further, the data part is extracted from the signal received by the receiving apparatus 20 according to the protocol and decoded to the original data and the control signal.

By this, the video data selected at the selecting unit 12 is transformed to the communication use data at the communication unit 13 and transmitted via the communication path 30 to the receiving apparatus 20. Further, the control signal received from the receiving apparatus 20 mentioned later is decoded at the communication unit 13 and input to the control unit 14.

The control unit 14 controls the parts of the transmitting apparatus 10 to make them perform the desired operations. For example, based on the program selection signal input from the receiving apparatus 20 via the communication path 30 and the communication unit 13, it controls the selecting unit 12 to detect the channel through which the video data of the program selected by the signal will be output and from which the output of the video data after the time t of that program will be started earliest and transmit the video data of that channel to the receiving apparatus 20.

The receiving apparatus 20 comprises a communication unit 21, a data storage unit 22, a decode unit 23, and a control unit 24.

The communication unit 21 carries out the communication of the data and the control signal with the transmitting apparatus 10. Concretely, it encodes the data and control signal to be transmitted to the transmitting apparatus 10 to coded data for communication, transforms the same to the data format according to the predetermined communication protocol, and transmits this to the communication path 30. Further, a data part is extracted from the signal received from the transmitting apparatus 10 according to the protocol and decoded to the original data and the control signal.

By this, the control signal, for example, the program selection signal, input from the control unit 24 mentioned later is transformed to the data for communication at the communication unit 21 and transmitted via the communication path 30 to the transmitting apparatus 10. Further, the video data of the program selected program received from the transmitting apparatus 10 is decoded at the communication unit 21 and input to the data storage unit 22.

The data storage unit 22 stores the video data of the start of the program to be delivered in advance and, at the same time, temporarily stores the video data transmitted from the transmitting apparatus 10. It appropriately selectively reproduces the video data so as to output all video data of the desired program to the viewer to enable viewing. In the present embodiment, the data storage unit 22 is a magneto-optic (MO) disc device.

The storage region of the data storage unit 22 is constituted by a head data storage region 26 and a reception data storage region 27. In the head data storage region 26, the predetermined time t worth of the video data of the start of the program to be delivered is stored in advance for every program to be sent. The reception data storage region 27 is further divided into a plurality of smaller storage regions.

Further, the data storage unit 22 accesses the MO disc, that is, the storage medium, by two heads A and B. These plurality of heads independently access the storage regions so the reading and writing of the data can be simultaneously carried out.

Figure 4:
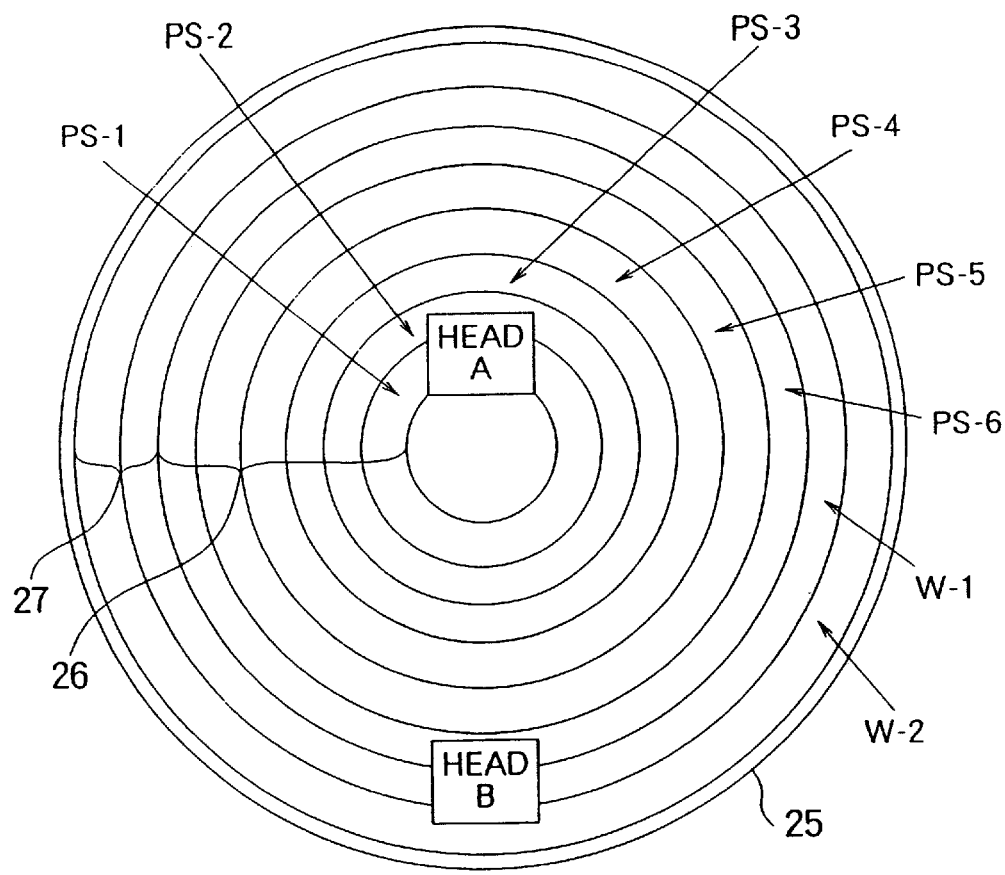
FIG. 4 is a view for explaining a data storage and reproduction system of a data storage unit of the receiving apparatus shown in FIG. 1.

The storage format of the video data on the MO disc 25 in the present embodiment is shown in FIG. 4.

As shown in FIG. 4, in the present embodiment, the MO disc 25 is divided for each storage track to set up separate regions. More specifically, the head data storage region 26 is secured in an inner circumferential portion of the MO disc 25, and the reception data storage region 27 is secured in an outer circumferential portion thereof. In the head data storage region 26, video data PS-1 to PS-6 of the first 10 minutes of each of the six programs PROGRAM-1 to PROGRAM-6 shown in FIG. 2 are stored from the inner circumferential portion in order. Further, the reception data storage region 27 is divided into two smaller storage regions W-1 and W-2.

Note that, in the present embodiment, the MO disc 25 on which the data of the starting part of the six programs PROGRAM-1 to PROGRAM-6 as shown in FIG. 4 are stored in advance is delivered from the program sending side. That MO disc is set in the MO disc device. This constitutes the data storage unit 22.

The decode unit 23 decodes the compressed digital video data output from the data storage unit 22, transforms the same to a signal which can be output to the TV monitor 42, and outputs the same to the TV monitor 42. In the present embodiment, the video signal compressed by the MPEG2 is input from the data storage unit 22. Therefore, the decode unit 23 decodes that signal and transforms it to an analog video signal of the NTSC system which can be displayed on a usual TV monitor 42.

Next, an explanation will be made of the operation of such a video data delivery system 1.

When a viewer uses the command input unit 41 to select a program, for example, PROGRAM-1, from among the programs to be delivered, due to the control of the control unit 24 of the receiving apparatus 20, the video data PS-1 of the first 10 minutes of the program PROGRAM-1 stored on the MO disc 25 of the data storage unit 22 in advance is immediately reproduced, decoded at the decode unit 23, and output to the TV monitor 42. By this, the audience can view the selected program immediately after the request.

Simultaneously with that processing, the control unit 24 requests transmission of the data starting after the 10 minutes of that program PROGRAM-1 from the transmitting apparatus 10 via the communication unit 21.

The transmission request signal for the video data of that program PROGRAM-1 input to the transmitting apparatus 10 via the communication path 10 is input via the communication unit 13 to the control unit 14. The control unit 14 controls the selecting unit 12 so as to find the channel at which the video data starting after the 10 minutes of the program PROGRAM-1 is output earliest from among the n number of channels of video data transmitted from the n number of data transmitting units $11_{-1}$ to $11_{-n}$ and selects that channel of the video data.

The video data selected at the selecting unit 12 is immediately transmitted to the receiving apparatus 20 while being coded to the communication use code at the communication unit 13.

The receiving apparatus 20, when receiving the video data starting after the 10 minutes of the program PROGRAM-1 from the transmitting apparatus 10, sequentially stores this by the head B in the first storage region W-1 of the reception data storage region 27 of the MO disc 25 of the data storage unit 22. When the data for 10 minutes, that is, from the 10th minute to the 20th minute of the program PROGRAM-1, is stored in the first storage region W-1, the reception video data is subsequently stored by the head B in the second storage region W-2. Thereafter, similarly, 10 minute portions of video data are sequentially stored in the first storage region W-1 and the second storage region W-2. Note that, when storing the data again in the same storage region, the previously stored data is updated and subsequently erased, but as will be mentioned later, the previous data has been read out by the head A at that time, so there is no problem.

On the other hand, the receiving apparatus 20, when the reproduction of the video data PS-1 of the start of the program PROGRAM-1 is ended by the head A, then subsequently reproduces the data of the first storage region W-1. This is decoded at the decode unit 23 and output to the TV monitor 42. When this head A accesses the first storage region W-1, the data received from the transmitting apparatus 10 has been already stored in that first storage region W-1. Accordingly, the video data starting after the 10 minutes received from the transmitting apparatus 10 is reproduced continuously with the video data up to the 10 minutes of the program PROGRAM-1 stored in the MO disc 25 in advance and output to the TV monitor 42.

Figure 5:
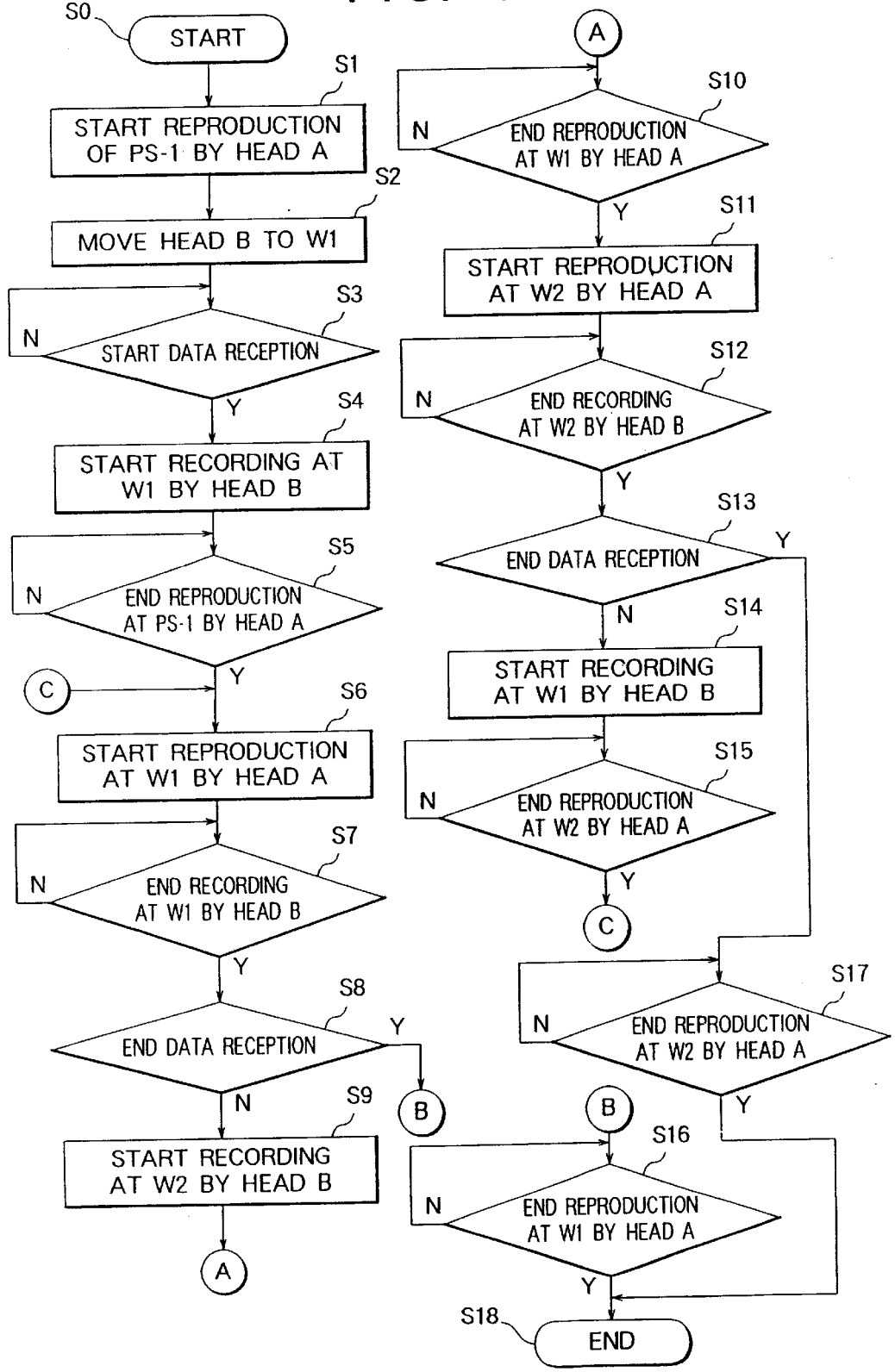
FIG. 5 is a flow chart for explaining a method of access of a data storage medium shown in FIG. 4.

Next, a detailed explanation will be made of storage and reproduction operation of the video data with respect to the MO disc 25 of the data storage unit 22 in such an operation of the data delivery system 1 referring to the flow chart of FIG. 5.

In the data storage unit 22, when a viewer carries out an operation for selecting the program PROGRAM-1 (Step S0), first, the reproduction of the video data PS-1 of the first 10 minutes of the program PROGRAM-1 is started by the head A (Step S1). Further, simultaneously with this, the head B is moved to the position of the first storage region W-1 of the reception data storage region 27 and made to wait in a data write enable state (Step S2). The reception of the requested desired data is awaited (Step S3). Then, when the reception of that data, that is, the video data starting after the 10 minutes of the program PROGRAM-1 selected by the viewer, is started, that reception data is sequentially stored in the first storage region W-1 of the reception data storage region 27 of the MO disc 25 by the head B (Step S4).

Next, in the data storage unit 22, when the end of the reproduction of the video data of the first 10 minutes of the program PROGRAM-1 started at step S1 is detected (Step S5) and the reproduction is ended, the head A is moved to the position of the first storage region W-1, where the reproduction of the received video data stored from step S4 is started (Step S6).

Then, at this time, the end of the writing of the received video data into the first storage region W-1 started from step S4 by the head B is detected (Step S7). In this case, in either of the case where 10 minutes' worth of video data of the received video data is stored or where the reception of the video data is ended, it is decided that the writing of the data to the first storage region W-1 is ended. Then, when the end of the writing is detected at step S7, it is decided whether or not the ending of writing is due to the end of reception of the video data (Step S8). When not due to the end of the reception of the video data, that is, when the video data of the program PROGRAM-1 continues to be received, the storage of the received video data to the second storage region W-2 is started by the head B (Step S9).

Further, at step S8, where it is decided that the writing of the data into the first storage region W-1 is ended due to the end of the reception of the video data, the writing of the data by the head B is ended as it is, and the end of the reproduction of the data of the first storage region W-1 by the head A started from step S6 is awaited (Step S16). When the reproduction is ended, this means that the reproduction of all video data of the program PROGRAM-1 is ended, so one series of processing in accordance with the request for viewing the program PROGRAM-1 by the viewer is ended (Step S18).

When the storage of the video data received at the second storage region W-2 by the head B is performed from step S9, the end of the reproduction of the video data of the first storage region W-1 by the head A is awaited (Step S10). When the reproduction is ended, the reproduction of the second storage region W-2 is subsequently started by the head A (Step S11).

Then, this time, the end of the writing of the received video data into the second storage region W-2 started by the head B from step S9 is detected (Step S12). When the end of writing is detected, it is further decided whether or not the end of the writing is due to the end of the reception of the video data (Step S13), and where it is not due to the end of the reception of the video data, that is, where the video data of the program PROGRAM-1 is continuously received, the storage of the received video data to the first storage region W-1 is started again by the head B (Step S14).

At step S13, where it is decided that the writing of the data into the second storage region W-2 has been ended due to the end of reception of the video data, the writing of the data by the head B is ended as it is, the end of the reproduction of the data of the second storage region W-2 by the head A started from step S11 is awaited (Step S17), and one series of processing is ended (Step S18).

When the storage of the video data received at the first storage region W-1 by the head B is performed from step S14, the end of the reproduction of the video data of the second storage region W-2 by the head A is awaited (Step S15). When the reproduction is ended, the reproduction of the first storage region W-1 is started by the head A (Step S6).

Below, similarly, the processing after step S6 is repeated. Then, as mentioned before, the end of the reception video data is detected at step S8 or step S13, and the received video data are all reproduced at step S16 or step S17, whereby all processing of the reproduction of the program PROGRAM-1 is ended.

As explained above, in the data sending system 1 of the present embodiment, a desired program can be immediately provided to the viewer from the point of time when the request is made even though the system configuration is almost equal to that of an NVOD system heretofore. Namely, the function of a VOD system can be realized.

Further, in the data delivery system 1 of the present embodiment, while it is necessary to provide a means for newly storing the video data in the receiving apparatus, this means is a means for storing short, high efficient coded digital video data, therefore can be sufficiently constituted by an already existing hard magnetic disc device, MO disc device, or the like. Further, in the data delivery system 1 of the present embodiment, it is not necessary to transmit the video data stored in the storage means in the receiving apparatus, so the number of channels necessary for transmission can be reduced. Due to this, the size of the hardware becomes almost equivalent to that of the NVOD system heretofore.

Note that, the delivery system of the present invention is not limited to the present embodiment. Various modifications are possible.

For example, in the data delivery system of the present invention, it is necessary to store the data of the starting part of the video data to be delivered in the receiving apparatus in advance. In the present embodiment, an MO disc on which such data of the starting parts of a plurality of programs were stored in advance was delivered from the program sending side. By setting the MO disc in the receiving apparatus, the data was input into the receiving apparatus. However, it is also possible to configure the system so as to transmit the data of the starting part of the video data to be delivered in advance using the transmission path for sending the video data and store it.

Further, it is also possible to adopt a configuration In which the data of the starting part of the video data to be delivered is stored in the storage medium, for example, a data stream tape, DAT, or VTR tape and delivered, and the data of these storage media is loaded on the reception side and fetched into the receiving apparatus.

Further, the data storage unit in that receiving apparatus Is not limited to an MO disc device and can be constituted by any storage device such as a hard magnetic disc device.

Further, it is also possible to constitute the storage means for storing the data of the starting part of the video data to be sent and the storage means for storing and reproducing the received video data by different storage means. A concrete example of the receiving apparatus given such a configuration is shown in FIG. 6.

Figure 6:
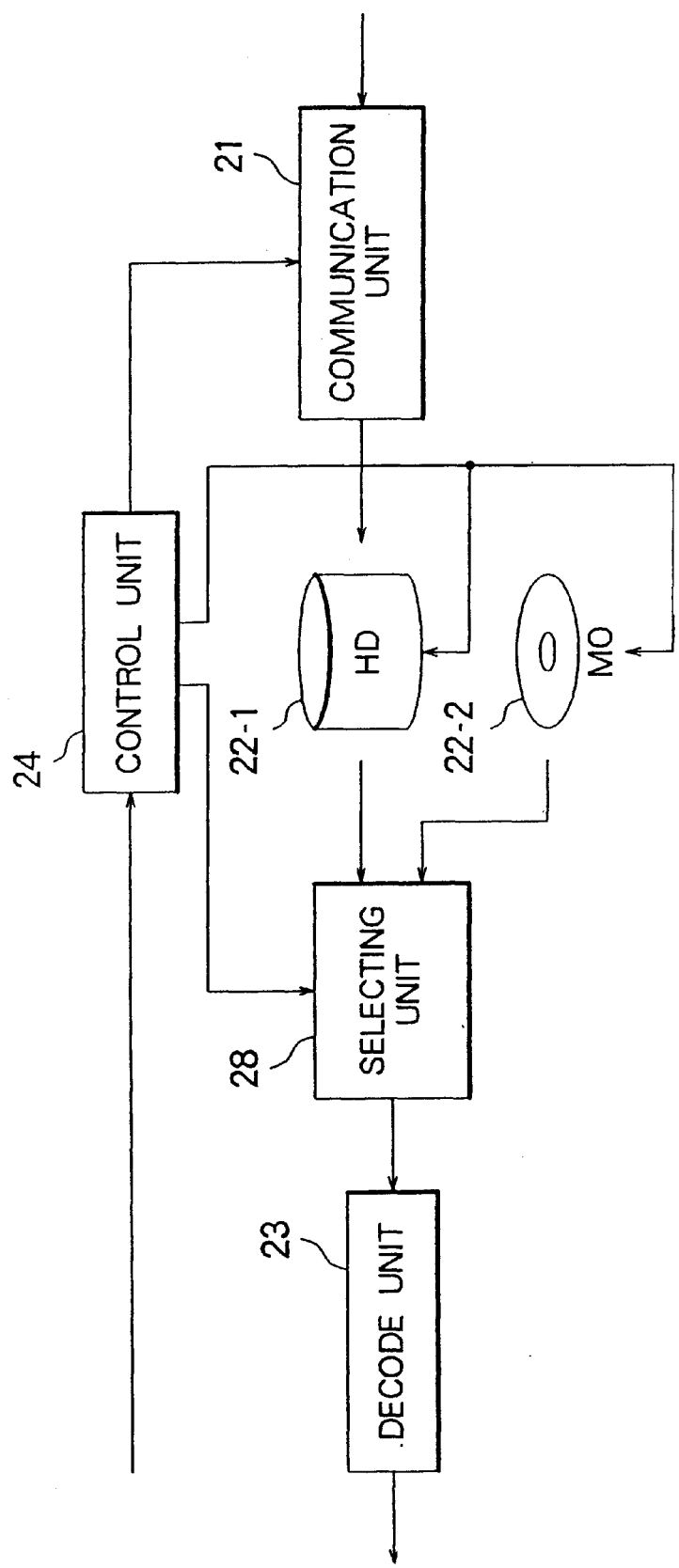
FIG. 6 is a view of the configuration of a modification of the receiving apparatus shown in FIG. 1.

In the receiving apparatus 20b shown in FIG. 6, the data storage unit 22 is constituted by a first data storage unit $22_{-1}$ composed by a hard magnetic disc device and a second data storage unit $22_{-1}$ composed by an MO disc device. In the second data storage unit $22_{-2}$, the MO disc on which the data of the starting part of the video data to be sent delivered from the sending side is mounted and used for the reproduction of the video data of the starting part of each program. Further, the first data storage unit $22_{-1}$ is used for the storage and reproduction of the video data transmitted from the transmitting apparatus via the communication path.

Outputs of such first data storage unit $22_{-1}$ and the second data storage unit $22_{-2}$ are appropriately selected at the selecting unit 28 and output.

When adopting such a configuration, an MO unit device having portability and a large capacity and high speed access hard magnetic disc device can be adequately used and so a more preferred receiving apparatus can be constructed.

Further, in the data storage unit of the receiving apparatus of the present embodiment, by accessing the storage medium by two heads, the storage and reproduction of the data are simultaneously carried out. If the data storage unit can perform a sufficiently high speed access, however, it is also possible to perform the operations of the storage and reproduction by one head in a time division manner. Further, it is also possible to access it using two or more heads.

Further, in the data delivery system 1 of the present embodiment, one channel was selected from a plurality of channels from which the video data were output within the transmitting apparatus based on the signal transmitted from the receiving apparatus and transmitted to the receiving apparatus. However, it is also possible to transmit the video data of a plurality of channels to the receiving apparatuses as they are from the transmitting apparatus and select a desired channel from among the plurality of channels on the receiving apparatus side.

Figure 7:
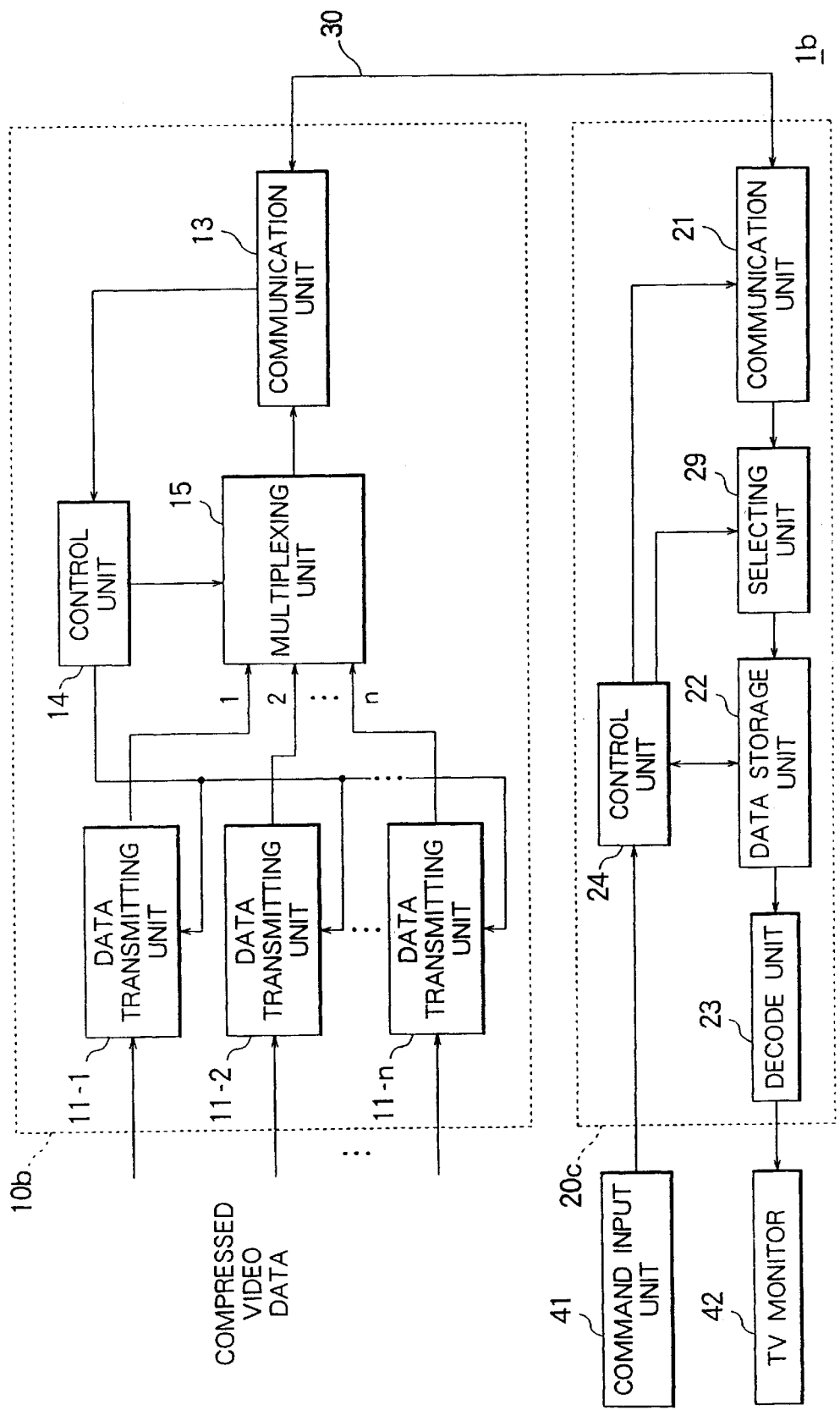
FIG. 7 is a view of the configuration of a modification of the data delivery system shown in FIG. 1.

A video data delivery system 1b having such a configuration is shown in FIG. 7.

In the transmitting apparatus 10b of FIG. 7, the video data output from n number of data transmitting units $11_{-1}$ to $11_{-n}$ are multiplexed at a multiplexing unit 15, and the multiplexed video data are transmitted from he communication unit 13 to the receiving apparatus 20a via the communication path 30.

Then, at the selecting unit 29 of the receiving apparatus 20c, based on the input program selection signal, a desired channel is selected from among the n number of channels of transmitted video data and the selected channel of the video data is output to the data storage unit 22.

When adopting such a configuration, in the transmitting apparatus 10c, it is not necessary to transmit the video data for each receiving apparatus 20. The same multiplexed video data may be transmitted to all receiving apparatuses of the users.

According to the data delivery system of the present invention, an environment of an VOD system can be provided with a system configuration equivalent to that of an NVOD system. Namely, the system with which immediate viewing of a-program becomes possible at any time can be constructed by a simple system configuration.

Further, according to the video data receiving apparatus of the present invention, immediate viewing of a program can be made possible from a point of time when the viewer requests it while receiving the video data sent staggered by predetermined times in the same way as an NVOD system.

What is claimed is:

1. A data delivery system in which a transmitting apparatus sends a program including video and/or audio data to a receiving apparatus in response to a request therefrom, said data delivery system comprising:
   communication means provided in said receiving apparatus for sending said request for said program to said transmitting apparatus;
   communication means provided in said transmitting apparatus for receiving said request for said program from said receiving apparatus;
   data output means provided in said transmitting apparatus for outputting first data corresponding to a predetermined time's worth of data at the start of said program, and outputting to a plurality of channels second data corresponding to the remainder of the program subsequent to said first data; each channel being staggered by a time zone which is less than said predetermined time; said second data being output in response to said request from said receiving apparatus;
   channel selecting means for selecting the channel from amongst said plurality of channels whose second data starts earliest in response to said request from said receiving apparatus;
   storing means provided in said receiving apparatus for storing said first data and said second data in a hard-disk; and
   reproducing means provided in said receiving apparatus for reproducing said first data stored in said storing means and reproducing said second data stored in said storing means subsequent to the reproduction of said first data.

2. A data delivery system in which a transmitting apparatus sends a program including video and/or audio data to a receiving apparatus in response to a request therefrom, said data delivery system comprising:
   communication means provided in said receiving apparatus for sending said request for said program to said transmitting apparatus;
   communication means provided in said transmitting apparatus for receiving said request for said video program from said receiving apparatus;
   data output means provided in said transmitting apparatus for outputting to a plurality of channels a remaining portion of said program subsequent to a predetermined time's worth of data at the start of said program; each channel being staggered by a time zone which is less than said predetermined time; said remaining portion being transmitted in response to said request from said receiving apparatus;
   channel selecting means for selecting the channel from amongst said plurality of channels whose remaining portion will be output earliest in response to said request from said receiving apparatus; and
   reproducing means provided in said receiving apparatus for reproducing from disk media said predetermined time's worth of data at the start of said program and said remaining portion of said program output from said transmitting apparatus.

3. A data delivery system as set forth in claim 2, wherein said disk media is removable media.

* * * * *